United States Patent [19]
Buelow et al.

[11] Patent Number: 5,178,846
[45] Date of Patent: Jan. 12, 1993

[54] METHOD FOR THE PREPARATION OF WIDE-PORE CRYSTALLINE ALUMINOPHOSPHATE MOLECULAR SIEVE

[75] Inventors: Martin Buelow, Berlin; Elke Jahn, Bochum; Ulrich Schuelke, Berlin; Karl Becker, Bad Koesen; Peter Kraak, Leipzig; Roland Thome; Arno Tissler, both of Bonn, all of Fed. Rep. of Germany

[73] Assignee: Vereinigte Aluminium-Werke A.G., Bonn, Fed. Rep. of Germany

[21] Appl. No.: 725,034

[22] Filed: Jul. 3, 1991

[30] Foreign Application Priority Data

Jul. 5, 1990 [EP] European Pat. Off. ........ 90112880.1

[51] Int. Cl.$^5$ ............................................. C01B 33/34
[52] U.S. Cl. .................................... 423/710; 502/208; 423/718
[58] Field of Search ............... 423/305, 306, 326, 328, 423/329, 330; 502/208, 214

[56] References Cited

U.S. PATENT DOCUMENTS

| | | |
|---|---|---|
| 3,911,041 | 10/1975 | Kaeding et al. ........... 260/682 |
| 3,972,832 | 8/1976 | Butter et al. ............. 252/437 |
| 4,440,871 | 4/1984 | Lok et al. ............... 502/214 |
| 4,535,070 | 8/1985 | McDaniel et al. ......... 502/208 |
| 4,665,251 | 5/1987 | Chu .................... 585/415 |

FOREIGN PATENT DOCUMENTS

| | | |
|---|---|---|
| 130013 | 1/1985 | European Pat. Off. . |
| 141662 | 5/1985 | European Pat. Off. . |
| 146385 | 6/1985 | European Pat. Off. . |
| 146386 | 6/1985 | European Pat. Off. . |
| 146387 | 6/1985 | European Pat. Off. . |
| 146388 | 6/1985 | European Pat. Off. . |
| 146389 | 6/1985 | European Pat. Off. . |
| 146390 | 6/1985 | European Pat. Off. . |
| WO89/01912 | 3/1989 | PCT Int'l Appl. . |
| WO89/09749 | 10/1989 | PCT Int'l Appl. . |

OTHER PUBLICATIONS

EP Search Report for Application No. 90 11 2880 Mar. 1991.
Davis et al., Zeolites 9:436-439, 1989.
Davis et al., Nature 331:698-699, 1988.
Derouane et al., "MCM-9: A Very Large Pore Silico-Alumino-Phosphate Molecular Sieve", *Zeolites in the '90s*, pp. 119-120, Elsevier Publishing Co., Amsterdam, 1989.
Flanigen et al., Proceedings of the Seventh International Zeolite Conference, Elsevier, Amsterdam, 1988, pp. 103-112.
Jacobs et al., "Synthesis of High-Silico Aluminosilicate Zeolites", *Studies in Surface Science and Catalysis*, vol. 33, pp. 113-146, Elsevier, Amsterdam, 1987.

*Primary Examiner*—R. Bruce Breneman
*Attorney, Agent, or Firm*—Darby & Darby

[57] ABSTRACT

An economical and environmentally safe method for synthesizing wide-pore aluminophosphate crystalline molecular sieves primarily involves inorganic synthesis requiring no structure-directing organic templates. In addition to aluminium and phosphate, further components selected from group IV of the periodic table of elements can be added to synthesize multi-component phosphate molecular sieves such as germano-silico-alumino-phosphate crystalline structures.

29 Claims, 1 Drawing Sheet

METHOD FOR THE PREPARATION OF WIDE-PORE CRYSTALLINE ALUMINOPHOSPHATE MOLECULAR SIEVE

FIELD OF INVENTION

This invention relates to crystalline molecular sieves. More particularly the present invention is an economical and environmentally safe, organic-template free method for preparing wide pore aluminum/phosphorous (aluminophosphate) molecular sieves.

BACKGROUND OF THE INVENTION

Aluminum/silicon (aluminosilicate) molecular sieves of the zeolite type are known in the art. For instance, U.S. Pat. No. 3,702,886 is one of the earliest disclosures teaching the synthesis of pentasil zeolites with high silica content.

Zeolites have framework structures consisting of a rigid three-dimensional network of $SiO_2$ and $AlO_4$ tetrahedra crystalline aluminosilicates which have lattice frameworks containing arrays of small voids interconnected by channels or pores. These lattices are limited in dimension to definite ranges of values. Thus, these lattice structures are capable of absorbing molecules only of certain dimensions which makes them suitable for use as molecular sieves.

Zeolite molecular sieves which are subsequently modified with the addition of phosphorus to the aluminum and silicon are also known. For instance U.S. Pat. Nos. 3,972,832; 3,911,041 and 4,665,251, all describe modification of aluminosilicate zeolites by subsequent incorporation with a phosphorus-containing compound.

In addition to aluminosilicate zeolites impregnated with phosphorous, there is also a separate class of porous synthetic silico-alumino-phosphate crystals (known in abbreviation as SAPO). U.S. Pat. No. 4,440,871 describes hydrothermal crystallization of gels consisting of silicon, aluminum and phosphorous to form microporous SAPO crystalline structures.

Such phosphates have characteristic catalytic properties depending on the species variant, and like zeolites, have different size pore openings and variations in pore geometry. Thus, the variants display specific ability to adsorb and desorb inorganic and organic molecules of characteristic sizes. However, the range of pore openings for such molecular sieves is limited to between about 2.1 and 7.4 angstroms, making them unsuitable for selective processing of molecules with effective cross sections larger than this range of pore widths.

European Patent No. 0,146,389 claims the discovery of a different type of silico-alumino-phosphate crystal which they designate as "MCM-9". MCM crystals are said to differ from their SAPO counterparts in the procedural steps of their manufacture and in their structural data, especially in their relative ion-exchange, catalytic and sorption properties of the MCM type. PCT/WIPO Publication No. WO 89/01912 claims the discovery of yet another type of silico-alumino-phosphate crystal which they designate as "VPI-5".

Derouane et al., in their article *MCM-9: A Very Large Pore Silico-alumino-phosohate Molecular Sieve*, in P.A. Jacobs et al., Zeolites in the Nineties, p. 119, Elsevier Publishing Co., Amsterdam, Netherlands (1989), state that they believe the two silico-alumino-phosphate molecular sieves, MCM-9 (European Patent No. 0,146,389) and VPI-5 (PCT/WIPO Publication No. WO 89/01912), have the same structure. Derouane et al. further state that the relatively wider pore sizes of the VPI-5 molecular sieves represent one phase based on aluminum-phosphate, and are limited by 18-membered rings. (Id.)

The synthesis processes for the molecular sieves disclosed in European Patent No. 0,146,389 and PCT/WIPO Publication No. WO 89/01912 necessarily include the use of structure-directing organic substances referred to as template compounds. This additional requirement for organic templates escalates production costs, especially when the scale of the synthesis is enlarged. Additionally, these structure-directing templates are organic amines or quaternary ammonium compounds which are considered environmental hazards, producing dangerous by-products and pollutants.

European Patent No. 0,146,389 and PCT/WIPO Publication No. WO 89/01912 are both limited to describing synthesis of silico-alumino-phosphate molecular sieves. Neither reference suggests the possibility of creating variations in the selective properties of such sieves by varying the starting materials or adjusting synthesis parameters. For instance, neither disclosure provides for an alumino-phosphate combination without silicon, or for optimizing the nucleation phase and the crystallization rate to control crystalline size and morphology. Such variations are not possible from the teachings of either of these disclosures.

Without such means to vary parameters, the versatility of the resulting silico-alumino-phosphate molecular sieves is limited. This limitation in versatility makes it difficult to adapt these synthesis methods to specific separation problems faced.

Our invention proposes to solve the aforementioned shortcomings in the art.

OBJECTS OF THE INVENTION

It is an object of the present invention to provide an economical and ecologically safe, organic-template free and strictly inorganic method for the synthesis of wide-pored aluminophosphate molecular sieves.

It is also an objective to provide a method for producing an aluminophosphate molecular sieve having a well defined and ordered cavity structure which is suitable for use as a catalyst, a component of a catalyst, as a selective adsorbent, or as a sensor matrix.

A further objective is to provide a method for the synthesis of molecular sieves which, in addition to aluminum and phosphorous, contain additional elements selected from Group IV of the periodic table, such as a silicon and/or germanium.

Another objective is to synthesize a molecular sieve with a microporous spatial network structure consisting of a combination of $AlO_2^-$, $PO_2^+$, and optionally, $SiO_2$ or $GeO_2$ tetra-hedral components. Such a combination is suitable as a catalyst, a catalyst component, a sensor matrix, or, based on the geometry of its pore openings, a selective adsorbent for molecules with kinetic diameters of greater than or equal to 0.8 nm.

SUMMARY OF THE INVENTION

The present method produces crystalline aluminophosphate molecular sieves with a microporous cavity structure having pore inlet openings of at least 0.8 nm. The crystalline structure comprises $AlO_2^-$ and $PO_2^+$ tetrahedral building blocks and is produced by crystallization from a gelatinous reaction mixture of an aluminum compound, a phosphorus compound and water.

The phosphorus compound used for the preparation of the gelatinous reaction mixture should contain a phosphorous-oxy-phosphorous ( —P—O —P —) group, such as pyrophosphoric acid, linear or cyclic polyphosphoric acids with a chain length $\geq 3$, or their respective salts.

Suitable aluminum compounds for the reaction mixture include aluminum hydroxide gel, pseudo-boehmite, hydrargillite, gibbsite or aluminum isopropoxide. The molar ratio of $H_2O$ to $Al_2O_3$ in the reaction mixture is from 30 to 500, preferably from 40 to 150. The molar ratio of $P_2O_5$ to $Al_2O_3$ in the reaction mixture is from 0.5 to 2.6, preferably from 1 to 1.5.

The aqueous gelatinous reaction mixture can also have, in addition to aluminum and phosphorous, compounds essentially containing one or more elements from Group IV of the periodic table, such as germanium chloride, germanium ethylate, germanium oxide, colloidal siliceous solution (20 to 40% by weight of $SiO_2$), silica gel, pyrogenous amorphous silica or tetraethoxysilane. If silicon is to be added to the reaction mixture, the molar ratio of $SiO_2$, to $Al_2O_3$ is from 0.01 to 5, preferably $\leq 3$.

Optionally, a crystallization nuclei can also be part of the starting gelatinous reaction mixture. Such partially crystalline or crystalline-crystallization aids should have inter-lattice plane distances within the parameters set forth in the x-ray reflections listed in Table 1 (see below). For example, a suitable crystallization aid is an aged (but x-ray amorphous) nucleating gel with a $P_2O_5$ to $Al_2O_3$ ratio from 0.5 to 2.6, preferably from 1.0 to 1.5.

The reaction mixture is agitated and then treated hydrothermally for 2 to 150 hours at temperatures from 95° to 300° C. The following detailed description further describes the present invention.

DETAILED DESCRIPTION

Figure 1:
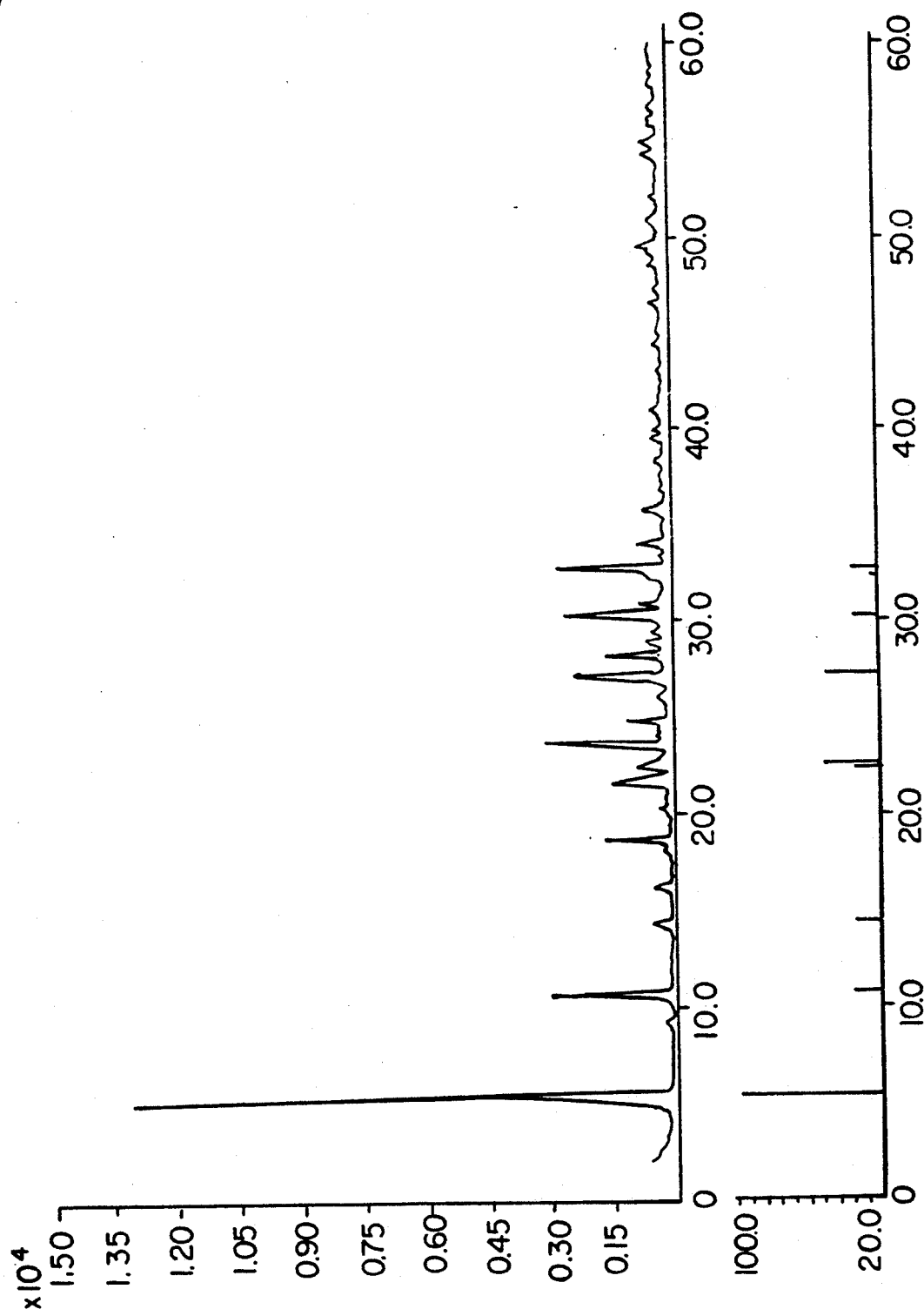
FIG. 1 shows the X-ray reflections obtained from a molecular sieve composition made according to the invention.

The following table lists the x-ray reflections (2 theta) and the interlattice plane distances calculated from the x-ray diffraction readings characteristic of the large-pore crystalline molecular sieves made pursuant to the present invention:

TABLE 1

| X-Ray Reflections (Cu-k α Radiation) 2-theta | Interlattice Plane Distances d (nm) | Relative Intensity |
|---|---|---|
| 5.2–5.6 | 17.00–15.78 | very strong |
| 10.65–10.8 | 8.31–8.19 | weak |
| 21.4–21.8 | 4.15–4.08 | weak |
| 21.65–22.0 | 4.11–4.04 | weak |
| 22.2–22.6 | 4.00–3.93 | weak |
| 23.6–23.7 | 3.77–3.75 | weak |
| 27.1–27.3 | 3.29–3.27 | weak |
| 28.7–29.1 | 3.11–3.07 | weak |
| 30.0–30.5 | 2.98–2.93 | weak |
| 32.7–32.9 | 2.74–2.72 | weak |

The interlattice plane distances (d) are calculated using the Bragg equation, n = 2d sin 0.

The relatively larger pore size nature of the molecular sieves of the present invention can be determined by using a single crystal refinement or by Rietvield powder refinement. The pore sizes can also be determined by sorption experiments with probe molecules of differing kinetic diameter. For instance, cyclohexane (with a kinetic diameter of 0.6 nm) is sorbed by the molecular sieves of the present invention.

In the present method, an aqueous suspension of aluminum oxide, such as pseudo-boehmite, is mixed intensively to form a gelatinous mixture. The gelatinous mixture is then treated with a phosphorus compound containing the —P—O —P group, such as polyphosphoric acid, pyrophosphoric acid and/or linear or cyclic polyphosphorus compounds with a chain length of $\geq 3$ or their salts, in the molar ratio of 1 $Al_2O_3$: 0.8–2.6 $P_2O_5$. The treated mixture is then homogenized.

In a preferred embodiment, the homogenized product is stirred and diluted with water to form a suspension with a solids content of at least 4.5% by weight. To this suspension is added an inorganic, crystallization-promoting compound, such as a crystalline or partially crystalline substance in the proportion of 5 to 30% by weight, based on the solids content of the suspension, and the subsequent mixture is further stirred. The inorganic, crystallization-promoting compound is selected from those that have at least the interlattice plane distances shown in the x-ray diffractions listed in Table 1, or an aged, yet still x-ray-amorphous, nuclei-forming gel, with a $P_2O_5$: $Al_2O_3$ ratio of 0.5 to 2.6 and preferably of 1 to 1.5.

The resulting mixture is subsequently subjected to a hydrothermal crystallization for at least 2 hours at temperatures from 95° to 300° C., and preferably from 120° to 150° C., in an autoclave.

The composition of the end-product, dried at 50° C., varies within the limits of the empirical formula:

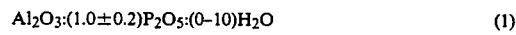

$$Al_2O_3:(1.0\pm0.2)P_2O_5:(0-10)H_2O \qquad (1)$$

and has at least the interlattice plane distances belonging to the x-ray reflections listed in Table 1.

In the embodiments containing additional components selected from compounds containing elements from Group IV of the periodic table, an aqueous suspension of aluminum oxide is mixed intensively with an alkali deficient source of silicic acid, or an alkali-deficient compound of another element from Group IV of the periodic table, in the molar ratio of 1 $Al_2O_3$: (0–5.0) $MO_2$, where M represents a Group IV element, to form a gelatinous mixture. Suitable sources for the silicic acid are siliceous colloidal solutions or precipitated silica which are previously aged preferably at a temperature in the range from 20° to 90° C. for at least 24 hours.

The gelatinous mixture is then treated with a phosphorus compound containing the —P—O—P—group (such as those mentioned above) in the molar ratio of 1 $Al_2O_3$: (0.8–2.6)$P_2O_5$, and homogenized into a suspension. Preferably, the homogenized product is stirred and diluted with water to a solids content of at least 4.5% by weight and an inorganic, crystallization-promoting compound (such as described above) is stirred into the suspension in the proportion of 5 to 30% by weight, based on the solids content of the suspension.

The resulting mixture is subjected for at least 2 hours to a hydrothermal crystallization at temperatures from 95° to 300° C. and preferably from 120° to 150° C. in an autoclave. The composition of the product, dried at 50° C., varies within the limits of the empirical formula:

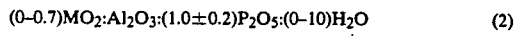

$$(0-0.7)MO_2:Al_2O_3:(1.0\pm0.2)P_2O_5:(0-10)H_2O \qquad (2)$$

where M represents a Group IV element
and has at least the interlattice plane distances belonging to the x-ray reflections listed in Table 1.

The invention is illustrated by the following non-limiting examples.

EXAMPLES

Example 1

To 220 g of an aluminum hydroxide gel with 2.3% by weight of $Al_2O_3$, 8.2 g of polyphosphoric acid with an average chain length of 8 are added with stirring. This reaction mixture is transferred to an autoclave and reacted for 20 hours at 130° C. under autogenous pressure. After the autoclave has cooled off, the product is filtered, washed and dried at 50° C. The filter cake consists of about 50% of the desired molecular sieve product with at least the interlattice plane distances belonging to the x-ray reflections listed in Table 1.

Example 2

To 220 g of an aluminum hydroxide gel with 2.3% by weight of $Al_2O_3$, 8.2 g of a polyphosphoric acid with an average chain length of 8 are added with stirring. To this reaction mixture, 4.2 g of a crystallization-promoting substance, with at least the interlattice plane distances belonging to the x-ray reflections listed in Table 1, are added and homogenized and reacted hydrothermally for 44 hours at 130° C. under autogenous pressure. After the autoclave has cooled off, the product is filtered off, washed and dried at 50° C. The filter cake consists of about 90% of the desired molecular sieve product with at least the interlattice plane distances belonging to the x-ray reflections listed in Table 1.

Example 3

To 100 g of an aluminum hydroxide gel with 2.3% by weight of $Al_2O_3$, 4.1 g of a polyphosphoric acid with an average chain length of 8 are added with stirring. The gel obtained is diluted with 107 g of water and homogenized. To this reaction mixture, 0.34 g of a crystallization-promoting substance with at least the interlattice plane distances belonging to the x-ray reflections listed in Table 1 is added and homogenized and reacted hydrothermally for 44 hours at 130° C. under autogenous pressure. The filter cake consists of about 90% of the desired molecular sieve product with at least the interlattice plane distances belonging to the x-ray reflections listed in Table 1.

Example 4

To 220 g of an aluminum hydroxide gel with 2.3% by weight of $Al_2O_3$, 8.2 g of polyphosphoric with an average chain length of 8 are added with stirring. This reaction mixture is stirred for 72 hours at 90° C. This aged, but still x-ray-amorphous nucleation gel is added to a second reaction mixture consisting of 2,200 g of an aluminum hydroxide gel with 2.3% by weight of $Al_2O_3$ and 82 g of a polyphosphoric acid with an average chain length of 8 and homogenized and reacted hydrothermally for 44 hours at 130° C. under autogenous pressure. The filter cake consists of about 80% of the desired molecular sieve product with at least the interlattice plane distances belonging to the x-ray reflections listed in Table 1.

Example 5

With intensive stirring, 65 g of water, 13.6 g of a pseudo boehmite (25% by weight water) and 17 g of polyphosphoric acid with an average chain length of 8 are homogenized. To this suspension, 5 g of siliceous sol (30% by weight of $SiO_2$) is added, also with stirring. This reaction mixture is transferred to an autoclave and reacted hydrothermally for 20 hours at 130° C. under autogenous pressure. After the autoclave has cooled off, the product is filtered, washed and dried at 50° C. The filter cake consists of about 50% of the desired silico-aluminophosphate with at least the interlattice plane distances belonging to the x-ray reflections listed in Table 1.

Example 6

To 220 g of an aluminum hydroxide gel with 2.3% by weight of $Al_2O_3$, 4.1 g of a polyphosphoric acid with the average chain length of 8 and 5.36 g of $GeCl_3$ are added with stirring. This reaction mixture is stirred for 72 hours at 90° C. and subsequently reacted hydrothermally for 44 hours at 130° C. under autogenous pressure. The filter cake consists of about 50% of the desired germano-silico-alumino-phosphate with at least the interlattice plane distances belonging to the x-ray reflections listed in Table 1.

What is claimed is:

1. A method for the synthesis of a crystalline aluminophosphate molecular sieve with a microporous cavity structure having pore inlet openings of at least 0.8 nm and without the use of organic structure directing compounds, comprising the steps of:
   mixing an aqueous suspension of aluminum oxide to form a gelatinous reaction mixture;
   treating said gelatinous mixture with a phosphorus compound containing a —P—O—P—group; and
   heating said treated mixture to a temperature from between 95° C. and 300° C."

2. The method of claim 1, wherein said sieve has at least the interlattice plane distances corresponding to the following:

| X-Ray Reflections (Cu-k α Radiation) 2-theta | Interlattice Plane Distances d (nm) | Relative Intensity |
| --- | --- | --- |
| 5.2–5.6 | 17.00–15.78 | very strong |
| 10.65–10.8 | 8.31–8.19 | weak |
| 21.4–21.8 | 4.15–4.08 | weak |
| 21.65–22.0 | 4.11–4.04 | weak |
| 22.2–22.6 | 4.00–3.93 | weak |
| 23.6–23.7 | 3.77–3.75 | weak |
| 27.1–27.3 | 3.29–3.27 | weak |
| 28.7–29.1 | 3.11–3.07 | weak |
| 30.0–30.5 | 2.98–2.93 | weak |
| 32.7–32.9 | 2.74–2.72 | weak. |

3. The method of claim 1 further comprising conducting said heating under hydrothermal conditions for between about 2 and about 150 hours.

4. The method of claim 1, wherein said aluminum oxide is selected from the group consisting of aluminum hydroxide gel, pseudo boehmite, hydrargillite, gibbsite and aluminum isopropoxide.

5. The method of claim 1, wherein said phosphorus compound is selected from the group consisting of pyrophosphoric acid, linear or cyclic polyphosphoric acid with a chain length of $\geq 3$, salts thereof, and combinations thereof.

6. The method of claim 1, having a molar ratio of $H_2O$ to $Al_2O_3$ in said gelatinous reaction mixture of 30 to 500.

7. The method of claim 6, having a molar ratio of $H_2O$ to $Al_2O_3$ in said gelatinous reaction mixture of 40 to 150.

8. The method of claim 1, having a molar ratio of $P_2O_5$ to $Al_2O_3$ in said treated mixture of 0.5 to 2.6.

9. The method of claim 1, having a molar ratio of $P_2O_5$ to $Al_2O_3$ in said treated mixture of 1 to 1.5.

10. The method of claim 1, wherein said gelatinous reaction mixture contains an additional compound having an element selected from Group IV of the periodic table.

11. The method of claim 10, wherein said additional compound contains silicon.

12. The method of claim 11, wherein said silicon compound is in the form selected from the group consisting of a siliceous sol (20 to 40% by weight of $SiO_2$), a silica gel, a pyrogenous amorphous silica, and a tetraethoxysilane.

13. The method of claim 12, having a molar ratio of $SiO_2$ to $Al_2O_3$ in the gelatinous reaction mixture of 0.01 to 5.

14. The method of claim 13, having a molar ratio of $SiO_2$ to $Al_2O_3$ in the gelatinous reaction mixture of 0.01 to 3.

15. The method of claim 13, having a molar ratio of $H_2O$ to $Al_2O_3$ in said gelatinous reaction mixture of 30 to 500.

16. The method of claim 15, having a molar ratio of $H_2O$ to $Al_2O_3$ in said gelatinous reaction mixture of 40 to 150.

17. The method of claim 13, having a molar ratio of $P_2O_5$ to $Al_2O_3$ in said treated mixture of 0.5 to 2.6.

18. The method of claim 17, having a molar ratio of $P_2O_5$ to $Al_2O_3$ in said treated mixture of 1.0 to 1.5.

19. The method claim 10, wherein said additional compound contains germanium.

20. The method claim 19, wherein said germanium compound is in the form selected from the group consisting of germanium chloride, germanium ethylate and germanium oxide.

21. The method claim 20, having a molar ratio of $GeO_2$ to $Al_2O_3$ in the gelatinous reaction mixture o f0 to 5.

22. The method claim 21, having a molar ratio of $GeO_2$ to $al_2O_3$ n the gelatinous reaction mixture of 0 to 3.

23. The method of claim 21, having a molar ratio of $H_2O$ to $Al_2O_3$ in said gelatinous reaction mixture of 30 to 500.

24. The method of claim 23, having a molar ratio of $H_2O$ to $al_2O_3$ in said gelatinous reaction mixture of 40 to 150.

25. The method of claim 21, having a molar ratio of $P_2O_5$ to $Al_2O_3$ in said treated mixture of 0.5 to 2.6.

26. The method of claim 25, having a molar ratio of $P_2O_5$ to $Al_2O_3$ in said treated mixture of 1.0 to 1.5.

27. The method of claim 1, wherein said gelatinous reaction mixture contains a crystallization aid.

28. The method of claim 27, wherein said crysallizaion aid is an aged, but still x-ray-amorphous, nucleating gel with a $P_2O_5$ to $Al_2O_3$ ratio of 0.5 to 2.6.

29. The method of claim 28, wherein said nucleating gel has a $P_2O_5$ to $Al_2O_3$ ratio of 1.0 to 1.5.

* * * * *

UNITED STATES PATENT AND TRADEMARK OFFICE
CERTIFICATE OF CORRECTION

PATENT NO.  : 5,178,846

DATED       : January 12, 1993

INVENTOR(S) : Martin BUELOW; Elke JAHN; Ulrich SCHUELKE;
              Roland THOME; and Arno TISSLER It is certified that error appears in the above-identified patent and that said Letters Patent is hereby corrected as shown below:

On the title page, in section [73], after "Germany" insert

--and Leuna-Werke AG, Leuna,

Fed. Rep of Germany--.

Signed and Sealed this

Tenth Day of May, 1994

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,178,846

DATED : January 12, 1993

INVENTOR(S) : Martin Buelow, Elke Jahn, Ulrich Schuelke, Karl Becker, Peter Kraak, Roland Thome, Arno Tissler It is certified that error appears in the above-identified patent and that said Letters Patent is hereby corrected as shown below:

On the title page, item [73]: Change the name of the

Assignee from "Vereinigte Aluminium-Werke A.G., Bonn, Fed. Rep. of Germany"

to --Vereinigte Aluminium-Werke A.G., Bonn, Fed. Rep. of Germany and

Leuna-Werke A.G., Leuna, Germany--.

Signed and Sealed this

First Day of November, 1994

*Attest:*

BRUCE LEHMAN

*Attesting Officer*    *Commissioner of Patents and Trademarks*